United States Patent [19]

Oney

[11] 4,187,441
[45] Feb. 5, 1980

[54] HIGH POWER DENSITY BRUSHLESS DC MOTOR

[75] Inventor: Wilford R. Oney, Schenectady, N.Y.

[73] Assignee: General Electric Company, Schenectady, N.Y.

[21] Appl. No.: 910,677

[22] Filed: May 30, 1978

Related U.S. Application Data

[63] Continuation-in-part of Ser. No. 780,407, Mar. 23, 1977, abandoned.

[51] Int. Cl.² ............................................. H02K 7/20
[52] U.S. Cl. .................................. 310/112; 310/126; 310/268
[58] Field of Search ............... 310/156, 159, 112, 126, 310/119, 124, 125, 268, 91

[56] References Cited

U.S. PATENT DOCUMENTS

| | | | |
|---|---|---|---|
| 2,479,589 | 8/1949 | Parker | 310/268 UX |
| 2,734,140 | 2/1956 | Parker | 310/268 |
| 2,873,395 | 2/1959 | Kober | 310/156 X |
| 2,907,903 | 10/1959 | Reijnst et al. | 310/156 |
| 3,061,750 | 10/1962 | Stegmaan | 310/262 |
| 3,230,406 | 1/1966 | Henry-Baudot | 310/268 X |
| 3,242,363 | 3/1966 | Kober | 310/268 X |
| 3,277,323 | 10/1966 | Parker | 310/268 X |
| 3,296,475 | 1/1967 | Parker | 310/268 |
| 3,324,321 | 6/1967 | Kober | 310/268 X |
| 3,407,320 | 10/1968 | McLean | 310/268 X |
| 3,413,503 | 11/1968 | Parker | 310/268 |
| 3,418,506 | 12/1968 | Parker | 310/112 X |
| 3,428,840 | 7/1969 | Kober | 310/268 X |
| 3,567,978 | 3/1971 | Parker | 310/124 |
| 3,581,389 | 6/1971 | Mori et al. | 310/268 X |
| 3,700,944 | 10/1972 | Heintz | 310/112 X |
| 3,979,619 | 9/1976 | Whiteley | 310/156 X |
| 4,067,732 | 1/1978 | Ray | 75/126 |

OTHER PUBLICATIONS

"Potential of Amorphous Alloys For Application in Magnetic Devices", Loborsky et al., J. Appl. Physics, 3/78, pp. 1769–1774.

Primary Examiner—Donovan F. Duggan
Attorney, Agent, or Firm—Donald R. Campbell; Joseph T. Cohen; Marvin Snyder

[57] ABSTRACT

A multiple disk, pancake, self-fed brushless dc motor characterized by high power density has a variable number of interleaved, axially spaced rotor and stator disks. The annular rotor disks are made of high coercive force permanent magnets such as cobalt-samarium and ferrites which do not demagnetize easily. The annular stator disks are yokeless and include a spirally wound laminated magnetic core made of steel strip or amorphous metal ribbon with opposing sets of stator slots and windings on both sides of the core. The permanent magnet machine can be operated as a generator.

6 Claims, 11 Drawing Figures

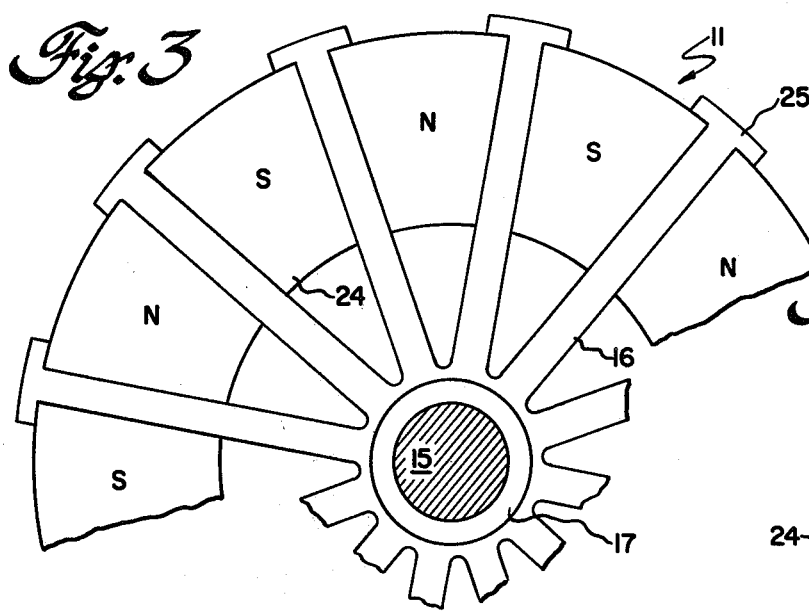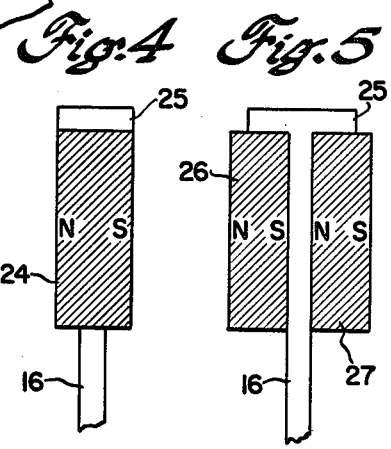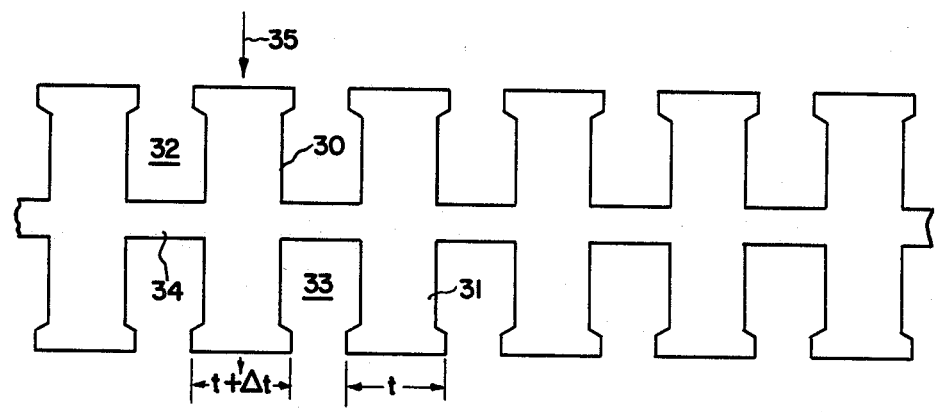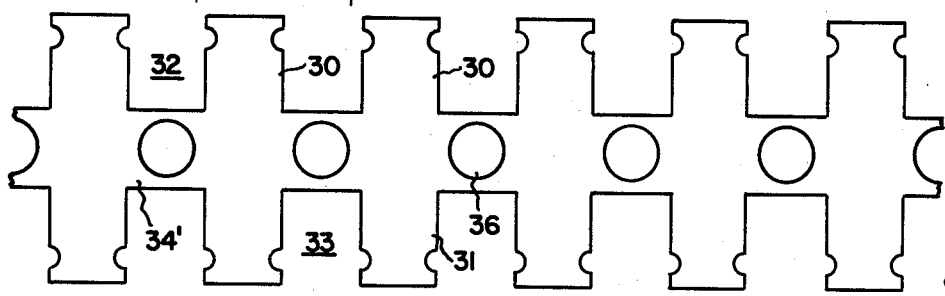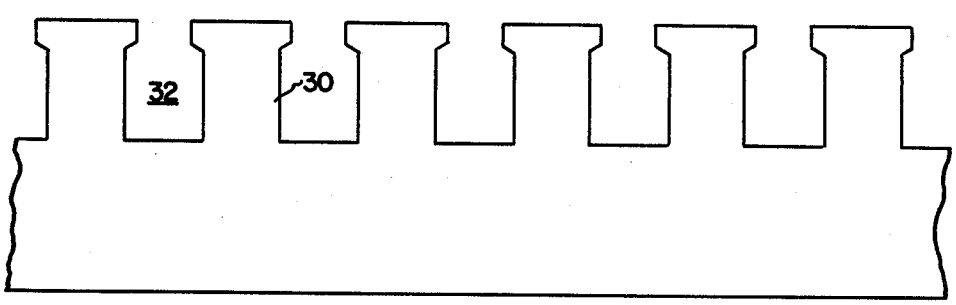

HIGH POWER DENSITY BRUSHLESS DC MOTOR

BACKGROUND OF THE INVENTION

The present application is a continuation-in-part of application Ser. No. 780,407 filed on Mar. 23, 1977, now abandoned.

This invention relates to brushless electric machines, and more particularly to a self-fed, high power density brushless dc motor with a multiple disk, pancake, rotor and stator structure.

There is an industrial and military need for high power density electric motors in a variety of applications such as adjustable speed motor drives and ordnance servo drives. The usual permanent magnet materials have sufficient flux density capability (for example, the remanent induction, $B_r$, of Alnico 5-7 is 12.9 kilogauss). However, armature reaction under overload or short circuit often exceeded the oerstead capability of the magnet, demagnetizing the magnet and resulting in degraded performance characteristics. This is a well known permanent magnet problem. Hence, a well-designed machine incorporating such usual magnetic materials in the rotor does not result in a light weight motor.

Also, the yoke or stator iron behind the stator teeth in conventional motor structures serves no power producing function and merely returns the magnetic flux to the roots of the teeth on the next pole of the motor. Elimination of the excess stator yoke material would therefore contribute to the realization of increased power density in an electrical machine.

SUMMARY OF THE INVENTION

The exemplary embodiment of the multiple disk, high power density electric machine herein described is a self-fed brushless dc motor with a variable number of interleaved, axially spaced rotor and stator disks depending on the application. The annular rotor disks comprise a plurality of circularly spaced, opposite polarity permanent magnet sectors made of high energy product permanent magnet materials with a high coercive force ($H_c$) which do not easily demagnetize, while yet having satisfactory flux density capability ($B_r$). These permanent magnet materials include rare earth, ferrite, and Alnico types; rotor disks made with cobalt-rare earths and other such permanent magnets are light weight and contribute significantly toward the objective of high power density. Annular stator disks located intermediate between two rotor disks comprise a spirally wound laminated magnetic core made of steel strip or low loss magnetic amorphous metal ribbon (such as $Fe_{80}B_{20}$) having opposing sets of outwardly directed stator slots, one set on either core side, in each of which is inserted a stator winding. This configuration eliminates most of the yoke material and greatly improves efficiency.

The magnetic flux is axially directed in active areas of the machine with provision at either end of the interleaved rotor and stator disks for carrying peripheral flux. A solid metal disk can be attached to an endmost rotor disk for this purpose, or the endmost stator disk can be similar to those previously described with only one set of stator slots and one winding, the other side having no slots and providing a laminated yoke. Two techniques are described for supporting the stator disks on the motor housing, one suitable for small motors and the other for large motors. The permanent magnet machine can also be operated as a generator.

Applications for the high power density motor are in electric vehicles and industrial adjustable speed drives, and as an ordnance servo drive motor and a starting motor.

BRIEF DESCRIPTION OF THE DRAWINGS

FIG. 3 is a fragmentary front view of a single annular rotor disk mounted on the motor shaft;

FIGS. 4 and 5 are cross sections taken radially through the rotor disk in FIG. 3;

FIGS. 6–8 are plan views of the punched steel strip for winding laminated stator magnetic cores for small and large motors, and for an end core with a laminated yoke as in FIG. 1;

DESCRIPTION OF THE PREFERRED EMBODIMENTS

Figure 1:
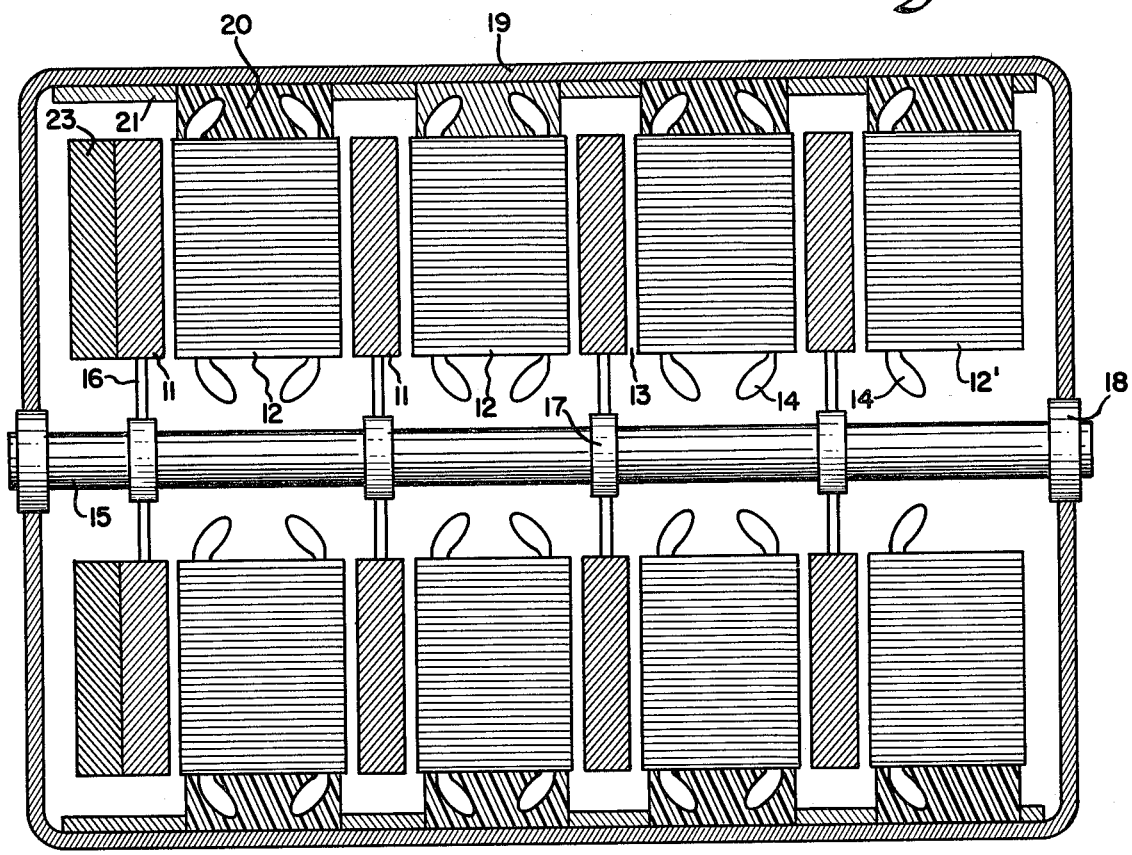
FIG. 1 is a schematic vertical cross section through the high power density self-fed brushless dc motor according to one embodiment suitable for small motors.
Figure 2:
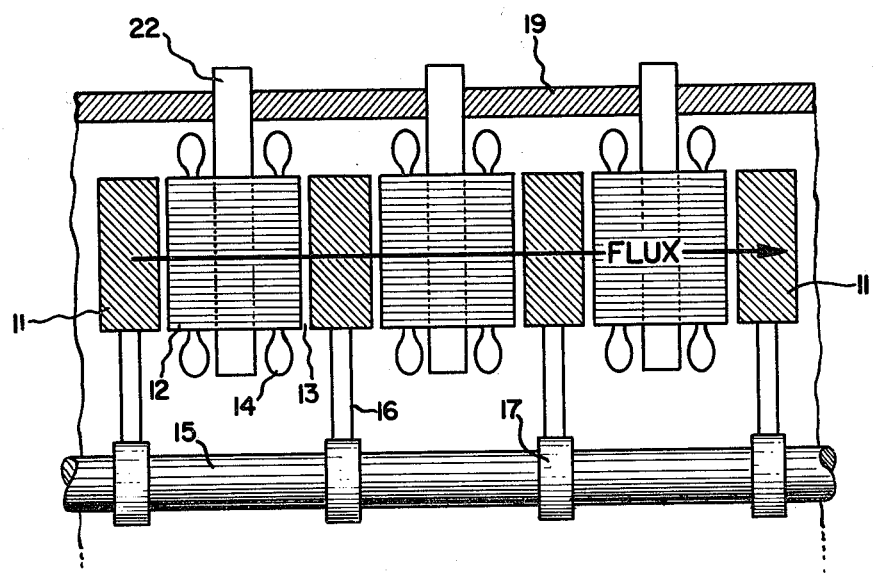
FIG. 2 is a fragmentary vertical cross section through a motor similar to that in FIG. 1 but with a modified stator disk mounting for large motors.

The improved, high power density, brushless dc motor is shown in FIG. 1 in a configuration for small motors. For large motors a different technique for mounting the stator disk on the motor housing is preferred and is illustrated in FIG. 2, although in other respects the motors are similar. The multiple disk, pancake, electric motor configuration permits stacking as many alternating rotor and stator disks as is necessary to meet the requirements of an intended application. In FIG. 1, the brushless dc motor comprises a selected number of interleaved and alternating annular permanent magnet rotor disks 11 and annular, spirally wound laminated stator disks 12 and 12' which are axially spaced from one another to establish axial air gaps 13 between adjacent disks. The permanent magnet rotor disks are made of high energy product permanent magnet materials, and utilize both the high coercive force, $H_c$, and high remanent induction, $B_r$, characteristic of these magnet materials. Thus, the disk rotor is not easily demagnetized, has good flux density capability, and can be made light weight. The annular laminated stator disks 12 are essentially yokeless and have a pair of opposing stator windings 14, one at each side of the spirally wound laminated magnetic core.

The rotor disks 11 are attached, either individually or in combination, for rotation with motor shaft 15 and, as here illustrated, the individual disks are secured to spokes 16 fixed to a hub member 17 which in turn is clamped to shaft 15. Bearings for the motor shaft are indicated at 18. Stator disks 12 and 12', on the other hand, are supported or mounted on the motor housing 19. To facilitate easy assembly, the outer periphery and outside stator winding end turns are formed with a larger diameter, encapsulating resin washer 20. A suitable process is to cast the outer periphery region in epoxy resin, and this serves also to insulate the coil end turns from the housing. In assembling the motor, spacer rings 21 are alternated with stator disks 12 and 12' so that resin washers 20 are retained between two spacer rings, one at either side. From the standpoint of cooling the motor, the selected resin should be a heat-conducting filler. For large motors, the technique in FIG. 2 may be required for mounting the annular stator disks on the motor housing. As will be explained in detail later, each laminated stator disk 12 or 12' has a radial hole between the two windings 14 in which is received an insulating stud 22, the outer ends of the stud being retained in holes in motor housing 19. In both embodiments, heat transfer from the stator winding and core are improved by the radial configuration. The machine is also suitable for ventilation by an external blower or fan which may be required for some large motors.

Movement of magnetic flux in active areas of the machine is in the axial direction, with the flux being turned around at the ends of the machine. To this end, magnetic yoke means is provided at both ends of the interleaved stator and rotor disks for carrying peripheral flux from one pole to the next pole. Two different yoke structures for accomplishing this are shown at the left and right of FIG. 1. At the left side a solid disk 23 made of steel or other metal, which need not be laminated because it is not cutting flux, is attached to the outer face of the endmost rotor disk 11. At the right side, as is further clarified in the discussion of FIG. 8, spirally wound stator disk 12' has a set of stator slots at only one side of the laminated magnetic core and consequently only one winding, the other side functioning as a continuous laminated yoke. In a practical motor, there can be a rotor disk at one end of the machine and a stator disk at the other end, or rotor disks at both ends, or stator disks at both ends, and thus the two return flux magnetic yoke structures can be intermixed or one or the other used exclusively.

The structure of an individual permanent magnet rotor disk 11 is shown in greater detail in FIGS. 3-5. The rotor disk comprises a plurality of circularly spaced, opposite polarity, permanent magnet sectors or sections 24 whose separation is typically 50 or 60 electrical degrees. As was previously discussed, the permanent magnet material for this application is a high energy product permanent magnet material such as cobalt-samarium and various ferrites characterized by a high coercive force and good flux density capability, so that there is a high resistance to demagnetization and the required volume of magnet material is relatively low. Additional suitable permanent magnet materials are other cobalt-rare earths and Alnico 9, whose composition is 7 percent aluminum, 15 percent nickel, 35 percent cobalt, 34 percent iron, 4 percent copper, and 5 percent titanium. Alnico 9 has the same composition as Alnico 8 but is processed differently to enhance the coercive force characteristic. In FIG. 3, spokes 16 projecting from hub member 17 are extended radially and have a cross piece 25 at the outer ends, the permanent magnet sectors being inserted between adjacent spokes and held from outward movement during rotation by the cross pieces. The rotor support just described is constructed of a nonmagnetic metal such as aluminum or an aluminum alloy. In the axial direction, each magnet sector can have a single permanent magnet 24 as in FIG. 4, or can have a pair of axially spaced sector-shaped permanent magnets 26 and 27 as in FIG. 5.

The spirally wound, laminated magnetic cores for the stator disks are fabricated from a continuous, thin strip of electrical grade steel or magnetic amorphous metal. Amorphous metals are also known as metallic glasses and exist in many different compositions including a variety of magnetic alloys which include iron group elements and boron or phosphorous. Metallic glasses are formed from alloys that can be quenched without crystallization, and these solids are mechanically stiff, strong and ductile, but more importantly have low losses and are low cost. Magnetic cores made from steel strip are described first. The preferred lamination punchings for double winding, yokeless, laminated stator disks located intermediate between two rotors are shown in FIGS. 6 and 7 for small and large motors. The steel strip is punched to define opposing stator teeth 30 and 31, alternating with opposing, outwardly directed stator slots 32 and 33, the teeth being connected by a thin web member 34. In order to have the slot openings line up as the strip is wound circularly to form an annular magnetic core, the tooth width is varied either continuously or as a step function. This is essential to accommodate diametrical increments as the strip is wound where the stator outside diameter/inside diameter ratio is large. Passage of flux through the core lamination is primarily in the direction of arrow 35, lengthwise along the stator teeth with little diversion of flux through the narrower web members 34, which function primarily to hold the teeth together. For large motors, the preferred punching pattern (see FIG. 7) includes a hole 36 in web member 34' for radial ventilation and/or to receive the insulated mounting studs 22 shown in FIG. 2.

FIG. 8 depicts the preferred punching of a stator core lamination for an endmost stator disk 12' having only one winding and a combined laminated yoke for carrying peripheral flux such as is shown at the right side of FIG. 1. One side of the steel strip is punched to define a single stator tooth 30 alternating with a slot opening 32, the other side being continuous and unpunched.

Figure 9:
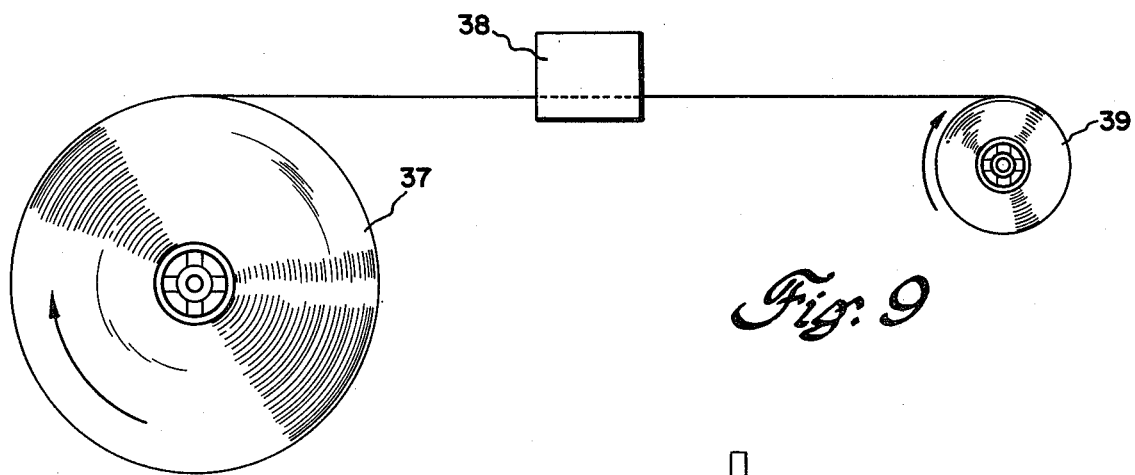
FIGS. 9 and 10 are sketches depicting automatic assembly of spirally wound stator magnetic cores for small and large motors.
Figure 10:
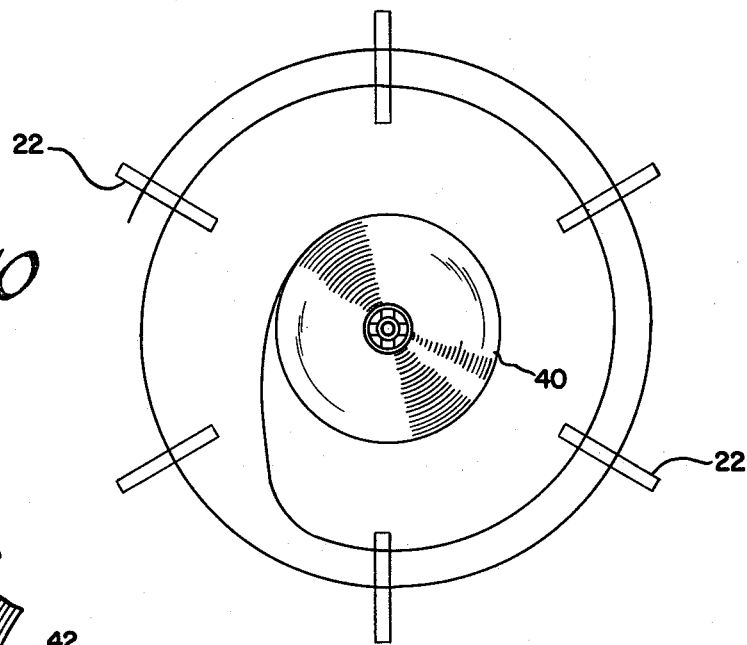

Automatic assembly of a spirally wound stator magnetic core for a small motor can be, for example, as illustrated in FIG. 9. A reel 37 of unpunched slit steel is unwound and fed through a punch press 38, and the punched strip is continuously wound on a bobbin 39 to form the annular magnetic core. The assembly of stator magnetic cores for large motors can be as shown in FIG. 10 and uses a reel 40 of prepunched strip. As the stacking of the laminated core proceeds, studs 22 are driven into holes 36 in the punched strip.

Amorphous metal motor laminations differ from those made of steel strip in that the material is very thin, with a practical limitation at present of about 2 mils in thickness, and furthermore the material is brittle like glass so that toothed laminations cannot be made by punching. Its natural configuration is a long, narrow and thin ribbon and this suggests an application for the flat pancake motor. Ribbon in uniform widths of one-half inch or greater can be processed by directing liquid alloy onto a rapidly rotating cold chill cylinder, the liquid alloy being changed into a solid ribbon before it becomes crystalline in a short time measured in microseconds. The cooling rate is in the order of $10^{6°}$ C./sec, and the thickness limitation is set by the rate of heat transfer through the already solidified material, which must be rapid enough that the last increment to solidify still avoids crystallization. Any of the magnetic alloys can be utilized but the preferred composition because of its high induction characteristics is the $Fe_{80}B_{20}$ alloy. Another suitable amorphous metal is $Fe_{40}Ni_{40}P_{14}B_6$ or the variation of this material sold as METGLAS® Alloy Ribbon 2826 MB by Allied Chemical Corp.

Amorphous metal ribbon of the $Fe_{80}B_{20}$ alloy has one-fourth the losses, at a given induction for sinusoidal flux, of the best oriented Fe-Si sheet steel. Additional information is given in the article "Potential of Amorphous Metals for Application in Magnetic Devices" by F. E. Luborsky et al, Journal of Applied Physics, Vol. 49, No. 3, Part II, March 1978, pp. 1769–1774.

Etching or chemical milling can be used on amorphous metal to make motor laminations, and while the process can be automated, the cost of chemicals may be expensive. A more effective technique to put slots in the ribbon is to draw the ribbon past a cutting laser beam, which can be controlled by a microprocessor. In FIG. 9, punch press 38 is replaced by a laser beam station and amorphous metal tape is drawn past the cutting beam as slots are cut out by the beam. Spacing of the slots is controlled so they will fall into a line when the ribbon is rolled up. This material is mechanically strong and can be pulled as the laminated stator core is wound spirally, resulting in a magnetic core with an improved stacking factor or packing fraction. That is, more flux is carried by a given volume of the core material and this contributes to the objective of a high power density machine. An alternative technique for making amorphous metal motor laminations directly from the alloy melt is disclosed and claimed in application, Ser. No. 903,140, filed on May 5,1978 by V. B. Honsinger and R. E. Tompkins, entitled "Method and Apparatus for Fabricating Amorphous Metal Laminations for Motors and Transformers", assigned to the same assignee as this invention.

Figure 11:
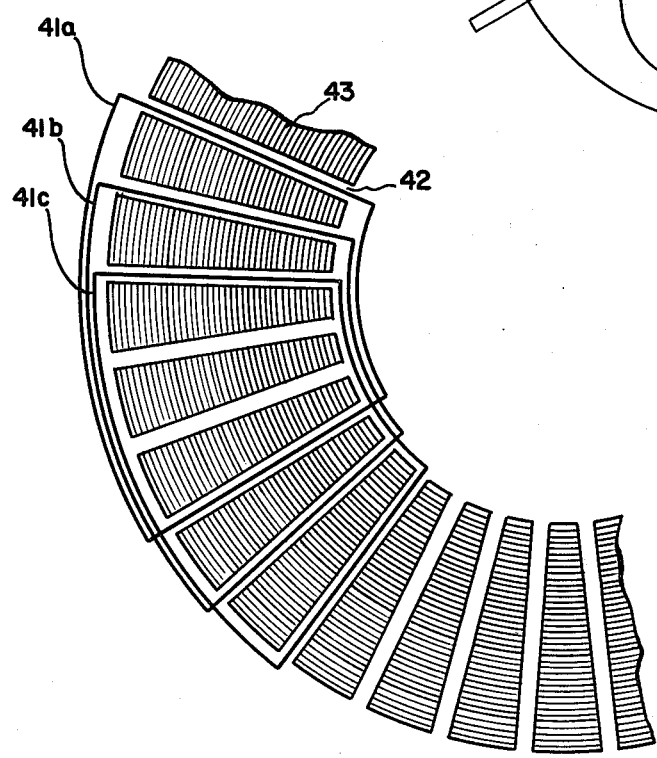
FIG. 11 is a fragmentary front view of a wound stator magnetic core illustrating diagrammatically in line form some of the coils of a conventional winding.

The stator winding is normally a conventional polyphase winding, but some savings of end turns may result with concentric windings. A third and potentially attractive idea which results in considerable savings of copper wire is a semitoroidal winding for random stators. A wound stator with a conventional winding is illustrated schematically in FIG. 11. Three coils 41a, 41b, and 41c are indicated diagrammatically in outline, inserted in the radial and outwardly directed stator slots 42 at one side of annular magnetic core 43. The second stator winding in the opposing set of stator slots at the other side of the core is a separate stator circuit and can be connected in parallel or in series with the first winding.

The motor structure for a self-fed brushless dc motor as here described is particularly advantageous for a four-pole or six-pole motor. Most commonly, the control circuitry includes an inverter fed from a dc source whose frequency is determined by a shaft position sensor. Excitation of the windings is therefore self-synchronous with shaft position. There are many applications for the high power density, self-fed brushless dc motor including, among others, a motor for an electric vehicle or industrial adjustable speed drive, an ordnance servo drive motor, and a starting motor.

Some comments on efficiency are important because it is a substantial factor in power density capability. The permanent magnet rotor, of course, has very little loss except surface losses, thereby contributing substantially to improved efficiency. Also, the absence of yoke material in the stator disk greatly improves efficiency. Heat transfer from the stator windings and core are improved by the radial configuration of the stator, which can be ventilated by an external fan if required.

The speed range of the brushless dc motor can be increased by rotating two stator disks with respect to each other. The series sum of back emf is reduced by the phase shift so the motor speeds up until its terminal emf equals the source voltage. When operating as a PM generator this feature can provide voltage regulation.

As will be understood by those skilled in the art, the permanent magnet machine herein described can also be operated as a generator, in which case the terminal voltage is the output voltage.

While the invention has been particularly shown and described with reference to several preferred embodiments thereof, it will be understood by those skilled in the art that various changes in form and details may be made therein without departing from the spirit and scope of the invention.

The invention claimed is:

1. A high power density self-fed brushless dc motor comprising
   a plurality of interleaved and alternating annular rotor disks and annular stator disks spaced from one another to establish an axial air gap between adjacent disks, and magnetic yoke means at either end of said interleaved rotor and stator disks for carrying peripheral flux which is provided at one end by a solid metal disk attached to an endmost rotor disk,
   a housing having a shaft journalled for rotation therein, and mounting means for supporting said stator disks on said housing and for attaching said rotor disks for rotation with said shaft,
   each rotor disk comprising a plurality of circularly spaced, opposite polarity cobalt-rare earth permanent magnet sectors,
   each stator disk intermediate between two rotor disks comprising a laminated magnetic core made of spirally wound metal strip and having opposing sides and a set of radial and outwardly directed stator slots at both core sides in which are respectively inserted a stator winding.

2. A high power density self-fed brushless dc motor comprising
   a plurality of interleaved and alternating annular rotor disks and annular stator disks spaced from one another to establish an axial air gap between adjacent disks, and magnetic yoke means at either end of said interleaved rotor and stator disks for carrying peripheral flux,
   a housing having a shaft journalled for rotation therein, and mounting means for supporting said stator disks on said housing and for attaching said rotor disks for rotation with said shaft,
   each rotor disk comprising a plurality of circularly spaced, opposite polarity cobalt-rare earth permanent magnet sectors,
   each stator disk intermediate between two rotor disks comprising a laminated magnetic core made of spirally wound metal strip and having opposing sides and a set of radial and outwardly directed stator slots at both core sides in which are respectively inserted a stator winding,
   an endmost stator disk and said magnetic yoke means at one end being comprised of a laminated magnetic core made of spirally wound metal strip having a set of radially and outwardly directed stator slots at only one core side in which is inserted a stator winding, the other side functioning as a laminated yoke.

3. A high power density electric machine comprising
   a plurality of interleaved and alternating annular rotor disks and annular stator disks spaced from one another to establish an axial air gap between adjacent disks, and magnetic yoke means at either end of said interleaved rotor and stator disks for carrying peripheral flux which is provided at one end by a solid metal disk attached to an endmost rotor disk, a housing having a shaft journalled for rotation therein, and mounting means for supporting said stator disks on said housing and for attaching said rotor disks for rotation with said shaft, each rotor disk comprising a plurality of circularly spaced, opposite polarity permanent magnet sectors, each stator disk intermediate between two rotor disks comprising a laminated magnetic core made of spirally wound amorphous metal ribbon and having opposing sides and a set of radial and outwardly directed stator slots at both core sides in which are respectively inserted a stator winding.

4. An electric machine according to claim 3 wherein said permanent magnet sectors are selected from the group consisting of cobalt-rare earth and ferrite magnets.

5. A high power density electric machine comprising a plurality of interleaved and alternating annular rotor disks and annular stator disks spaced from one another to establish an axial air gap between adjacent disks, and magnetic yoke means at either end of said interleaved rotor and stator disks for carrying peripheral flux, a housing having a shaft journalled for rotation therein, and mounting means for supporting said stator disks on said housing and for attaching said rotor disks for rotation with said shaft, each rotor disk comprising a plurality of circularly spaced, opposite polarity permanent magnet sectors, each stator disk intermediate between two rotor disks comprising a laminated magnetic core made of spirally wound amorphous metal ribbon and having opposing sides and a set of radial and outwardly directed stator slots at both core sides in which are respectively inserted a stator winding, an endmost stator disk and said magnetic yoke means at one end being comprised of a laminated magnetic core made of spirally wound amorphous metal ribbon having a set of radially and outwardly directed stator slots at only one core side in which is inserted a stator winding, the other side functioning as a laminated yoke.

6. An electric machine according to claim 5 wherein said permanent magnet sectors are selected from the group consisting of cobalt-rare earth and ferrite magnets.

* * * * *